United States Patent
Park et al.

(10) Patent No.: US 10,599,358 B2
(45) Date of Patent: Mar. 24, 2020

(54) METHOD FOR MOVING DATA EXTENT

(71) Applicant: TmaxData Co., Ltd., Gyeonggi-do (KR)

(72) Inventors: Jinwoo Park, Gyeonggi-do (KR); Hyungsoon Park, Gyeonggi-do (KR)

(73) Assignee: TmaxData Co., Ltd., Gyeonggi-do (KR)

( * ) Notice: Subject to any disclaimer, the term of this patent is extended or adjusted under 35 U.S.C. 154(b) by 36 days.

(21) Appl. No.: 16/020,095

(22) Filed: Jun. 27, 2018

(65) Prior Publication Data

US 2019/0384518 A1 Dec. 19, 2019

(30) Foreign Application Priority Data

Jun. 19, 2018 (KR) .................. 10-2018-0069968

(51) Int. Cl.
*G06F 12/00* (2006.01)
*G06F 3/06* (2006.01)
*G06F 16/23* (2019.01)
*G06F 16/11* (2019.01)
(Continued)

(52) U.S. Cl.
CPC ............ *G06F 3/0644* (2013.01); *G06F 3/061* (2013.01); *G06F 3/0689* (2013.01); *G06F 16/122* (2019.01); *G06F 16/23* (2019.01)

(58) Field of Classification Search
CPC ...... G06F 3/0644; G06F 3/0689; G06F 3/061; G06F 16/23; G06F 16/122
See application file for complete search history.

(56) References Cited

U.S. PATENT DOCUMENTS 5,721,915 A 2/1998 Sockut et al.
6,405,284 B1 * 6/2002 Bridge .................. G06F 3/0608
711/114
(Continued)

FOREIGN PATENT DOCUMENTS

KR 10-0561229 B1 3/2006
KR 1020117008649 12/2015
KR 1020170023735 7/2018

OTHER PUBLICATIONS

Office Action from the Korean Patent Office, dated Jun. 25, 2019 (10 pages).

*Primary Examiner* — Mark A Giardino, Jr.
(74) *Attorney, Agent, or Firm* — Alfred Y. Chu, Esq.; Brian B. Shaw, Esq.; Harter Secrest & Emery LLP

(57) ABSTRACT

Disclosed is a computer program stored in a computer readable medium according to an exemplary embodiment of the present disclosure. The computer program performs the following method for moving an extent when being executed by one or more processors of a computing device and the method may include: deciding, by the processor, movement of an extent stored in a first disk in a disk space in which the disk space includes at least two disks; determining, by the processor, whether there is writing work for the extent based on extent mapping information for the extent; changing, by the processor, a state of the extent to read-only in the extent mapping information when there is no writing work for the extent; moving, by the processor, the extent positioned in the first disk to a second disk; and updating, by the processor, the extent mapping information based on completion of the disk movement of the extent.

11 Claims, 10 Drawing Sheets

(51) Int. Cl.
   *G06F 13/00*   (2006.01)
   *G06F 13/28*   (2006.01)

(56) References Cited

U.S. PATENT DOCUMENTS

| | | | |
|---|---|---|---|
| 9,002,805 B1* | 4/2015 | Barber | G06F 16/215 |
| | | | 707/692 |
| 2002/0147881 A1* | 10/2002 | Pudipeddi | G06F 16/185 |
| | | | 711/1 |
| 2003/0093439 A1 | 5/2003 | Mogi et al. | |
| 2005/0055402 A1* | 3/2005 | Sato | H04L 29/06 |
| | | | 709/205 |
| 2005/0216462 A1* | 9/2005 | Xiao | G06F 16/2343 |
| 2017/0039094 A1* | 2/2017 | Dice | G06F 9/526 |

* cited by examiner

METHOD FOR MOVING DATA EXTENT

CROSS-REFERENCE TO RELATED APPLICATIONS

This application claims priority to and the benefit of Korean Patent Application No. 10-2018-0069968 filed in the Korean Intellectual Property Office on Jun. 19, 2018, the entire contents of which are incorporated herein by reference.

TECHNICAL FIELD

The present disclosure relates to a database management method, and more particularly, to a method for moving data.

BACKGROUND ART

Businesses of enterprises are rapidly expanding with explosive data growth and the emergence of diverse environments and platforms. As new business environments emerge, more efficient and flexible data services and information processing, and data management functions are needed. In response to these changes, a research is continued on databases to solve problems of high performance, high availability, and scalability which are foundations of corporate business implementation.

A database management system (DBMS) can allow data files to be stored in respective disks. In addition, the database management system can manage a disk space including the disks. Thus, the database management system can enhance data integration and improve accessibility to data. Representative examples of the database management system include Tibero, Oracle, and IMS.

Korean Patent No. 10-0561229 discloses a duplicating apparatus in which a plurality of original databases and a plurality of copy databases form a redundancy relationship. However, such a disclosure has a problem that an input/output speed decreases due to a lot of processing operations, and a balance of a capacity between the databases is not matched.

Thus, there may be a demand in the art for a method for moving an extent, which minimizes a time for which work for the data is constrained while maintaining consistency between the data in an operation of moving the data.

SUMMARY OF THE DISCLOSURE

The present disclosure has been made in an effort to provide a method for moving an extent of a data file to another storage location.

An exemplary embodiment of the present disclosure provides a computer program stored in a computer readable medium. The computer program performs the following method for moving an extent when being executed by one or more processors of a computing device and the method may include: deciding, by the processor, movement of an extent stored in a first disk in a disk space in which the disk space includes at least two disks; determining, by the processor, whether there is writing work for the extent based on extent mapping information for the extent; changing, by the processor, a state of the extent to read-only in the extent mapping information when there is no writing work for the extent; moving, by the processor, the extent positioned in the first disk to a second disk; and updating, by the processor, the extent mapping information based on completion of the disk movement of the extent.

Alternatively, the extent mapping information may be configured for each extent and may include at least one information of address information of the extent, state information of the extent, and a transaction sequence number of the extent.

Alternatively, when the work for the extent occurs, the transaction sequence number of the extent may be updated to the transaction sequence number of a worker thread performing the work for the extent.

Alternatively, the determining of, by the processor, whether there is the writing work for the extent based on the extent mapping information for the extent may include determining, by the processor, that there is the writing work for the extent when there is the worker thread transaction sequence number less than or equal to the transaction sequence number of the extent mapping information by comparing the transaction sequence number of the extent mapping information and the transaction sequence number of the worker thread and switching the worker thread performing the movement work for the extent to a sleep state when there is the writing work for the extent.

Alternatively, the method may further include modifying, when the writing work for the extent is completed, the transaction sequence number of the extent mapping information to the transaction sequence number of the worker thread.

Alternatively, the updating of by the processor, the extent mapping information based on the completion of the disk movement of the extent may include determining, by the processor, whether there is the work for the extent when the disk movement of the extent is completed and changing an extent state of the extent mapping information to loading when there is the work for the extent, updating the extent mapping information by waiting for the completion of the work, or updating the extent mapping information when there is no work for the extent.

Alternatively, when the extent state of the extent mapping information is loading, the worker thread accessing the extent mapping information may be switched to a standby state and written in a standby list.

Alternatively, movement for the extent stored in the first disk may be decided for rebalancing when a new disk is added to the disk space, the one or more disks are removed, or an error occurs in one of the at least two disks.

Alternatively, the method may further include resuming, by the processor, the writing work for the extent based on the update of the extent mapping information.

Alternatively, the method may further include deleting, by the processor, the extent positioned in the first disk.

Another exemplary embodiment of the present disclosure provides a method for moving an extent, which is performed by one or more processors of a computing device. The method may include: deciding, by the processor, movement of an extent stored in a first disk in a disk space in which the disk space includes at least two disks; determining, by the processor, whether there is writing work for the extent based on extent mapping information for the extent; changing, by the processor, a state of the extent to read-only in the extent mapping information when there is no writing work for the extent; moving, by the processor, the extent positioned in the first disk to a second disk; and updating, by the processor, the extent mapping information based on completion of the disk movement of the extent.

Yet another exemplary embodiment of the present disclosure provides a computer device. The computing device may include: one or more processors; and a memory storing commands executable in the one or more processors, in which the one or more processors may decide movement of an extent stored in a first disk in a disk space in which the disk space includes at least two disks, determine whether there is writing work for the extent based on extent mapping information for the extent, change a state of the extent to read-only in the extent mapping information when there is no writing work for the extent, move the extent positioned in the first disk to a second disk, and update the extent mapping information based on completion of the disk movement of the extent.

According to an exemplary embodiment of the present disclosure, a method for moving an extent of a data file to another storage location can be provided.

DETAILED DESCRIPTION

Figure 1:
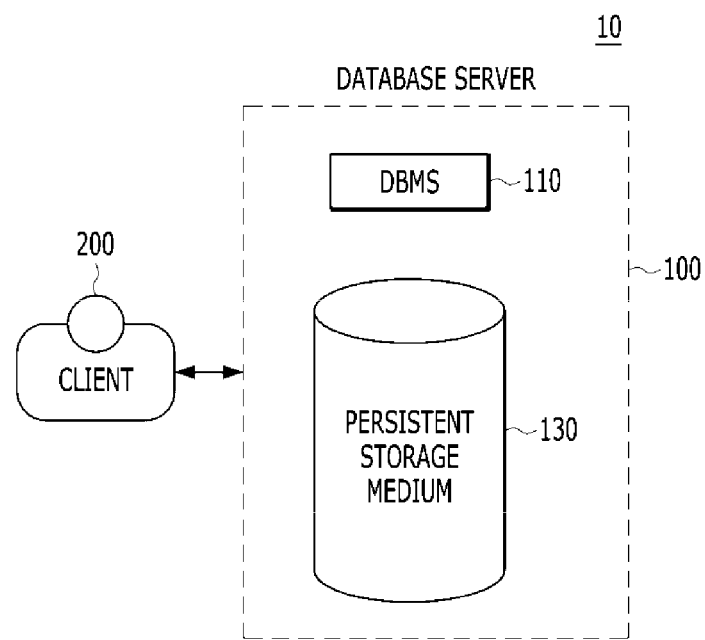
FIG. 1 is a schematic view of a database system according to an exemplary embodiment of the present disclosure.

Various embodiments will now be described with reference to drawings and like reference numerals are used to refer to like elements throughout all drawings. In the present specification, various descriptions are presented to provide appreciation of the present disclosure. However, it is apparent that the embodiments can be executed without the specific description. In other examples, known structures and apparatuses are presented in a block diagram form in order to facilitate description of the embodiments.

"Component", "module", "system", and the like which are terms used in the specification refer to a computer-related entity, hardware, firmware, software, and a combination of the software and the hardware, or execution of the software. For example, the component may be a processing process executed on a processor, the processor, an object, an execution thread, a program, and/or a computer, but is not limited thereto. For example, both an application executed in a computing device and the computing device may be the components. One or more components may reside in the processor and/or the execution thread and one component may be localized in one computer or distributed among two or more computers. Further, the components may be executed by various computer-readable media having various data structures, which are stored therein. The components may perform communication through local and/or remote processing according to a signal (for example, data from one component that interacts with other components and/or data through another system and a network such as the Internet through a signal in a local system and a distribution system) having one or more data packets, for example.

The description of the presented exemplary embodiments is provided so that those skilled in the art of the present disclosure use or implement the present disclosure. Various modifications of the embodiments will be apparent to those skilled in the art and general principles defined herein can be applied to other embodiments without departing from the scope of the present disclosure. Therefore, the present disclosure is not limited to the embodiments presented herein, but should be analyzed within the widest range which is consistent with the principles and new features presented herein.

FIG. 1 is a schematic view of a database system according to an exemplary embodiment of the present disclosure.

As illustrated in FIG. 1, the database system 10 according to the present disclosure may include a client 200 and a database server 100.

As illustrated in FIG. 1, the client 200 may mean a node(s) in a database system having a mechanism for communication through a network. For example, the client 200 may include a predetermined electronic device having connectivity with a personal computer (PC), a laptop computer, a workstation, a terminal, and/or the network. Further, the client 200 may include a predetermined server implemented by at least one of agent, application programming interface (API), and plug-in. For example, the client 200 in FIG. 1 may be associated with a user (e.g., database administration (DBA)) using the database server 100.

The database server 100 may include a predetermined type of computer system or computing device such as a microprocessor, a mainframe computer, a digital single processor, a portable device, and a device controller. Each of the database servers 100 may include a database management system (DBMS) 110 and a persistent storage 130. In addition, the database server 100 may be used interchangeably with a device for executing a query.

In FIG. 1, only one database server 100 is illustrated, but it will be apparent to those skilled in the art that database servers there than may also be included in the scope of the present disclosure and the database server 100 may include additional components. That is, the database server 100 may be constituted by a plurality of computing devices. A set of a plurality of nodes may constitute the database server 100. For example, although not illustrated in FIG. 1, the database server 100 may include one or more memories 120 including a buffer cache. Further, although not illustrated in FIG. 1, the database server 100 may include one or more processors 111. Therefore, the DBMS 110 may be operated by the processor 111 on the memory 120.

The memory 120 in the present specification as a primary storage device directly accessed by the processor, such as a random access memory (RAM) including a dynamic random access memory (DRAM), a static random access memory (SRAM), etc., may mean a volatile storage device in which stored information is momentarily erased when power is turned off, but is not limited thereto. The memory 120 may be operated by the processor 111. The memory 120 may temporarily store a data table including a data value. The data table may include the data value and in the exemplary embodiment of the present disclosure, the data value of the data table may be written in the persistent storage 130 from the memory 120. In an additional aspect, the memory 120 may include the buffer cache and data may be stored in a data block of the buffer cache. The data stored in the buffer cache may be written in the persistent storage by a background process.

The persistent storage 130 may mean a non-volatile storage medium which may consistently store predetermined data, such as a magnetic disk, an optical disk, and a magneto-optical storage device and a storage device based on a flash memory and/or a battery-backup memory. The persistent storage 130 may communicate with the processor and the memory of the database server 100 through various communication means. In an additional exemplary embodiment, the persistent storage 130 is positioned outside the database server 100 to communicate with the database server 100.

The DBMS 110 as a program for permitting the database server 100 to perform operations including parsing of a query, retrieval, insertion, modification, and/or deletion of required data may be implemented by the processor 111 in the memory 120 of the database server 100 as described above.

The client 200 and the database server 100 or the database servers may also communicate with each other through the network (not illustrated). The network according to the exemplary embodiment of the present disclosure may use various wired communication systems such as public switched telephone network (PSTN), x digital subscriber line (xDSL), rate adaptive DSL (RADSL), multi rate DSL (MDSL), very high speed DSL (VDSL), universal asymmetric DSL (UADSL), high bit rate DSL (HDSL), and local area network (LAN).

The network presented in the present specification may use various wireless communication systems such as code division multi access (CDMA), time division multi access (TDMA), frequency division multi access (FDMA), orthogonal frequency division multi access (OFDMA), single carrier-FDMA (SC-FDMA), and other systems. For example, the network may include a database link (dblink), and as a result, a plurality of database servers communicates with each other through the database link to fetch data from another database server 100. The techniques described in the present specification may be used in other networks in addition to the aforementioned networks.

Figure 2:
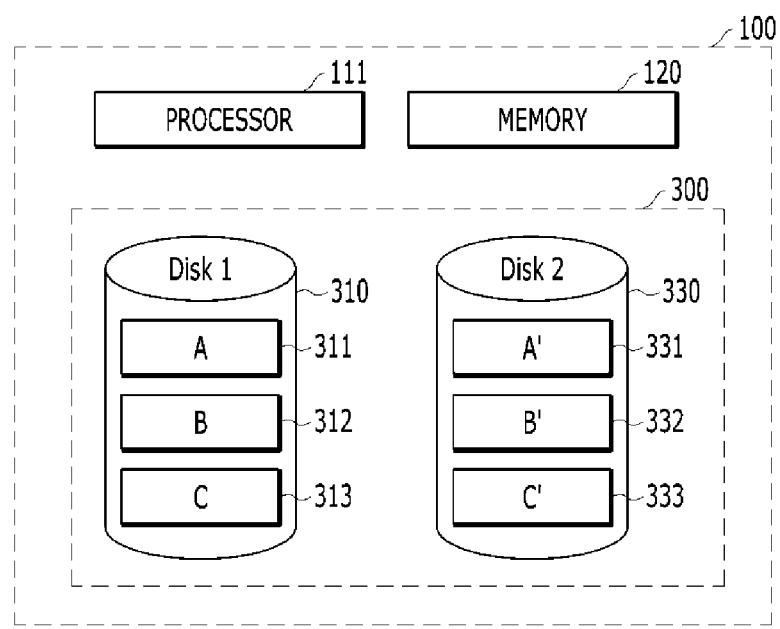
FIG. 2 is a conceptual view of a disk space according to an exemplary embodiment of the present disclosure.

FIG. 2 is a conceptual view of a disk space 300 according to an exemplary embodiment of the present disclosure.

The database server 100 may include the disk space 300 capable of storing data and the processor 111. Herein, the disk space may store an encrypted signal, a database table, or a data stream that is a stream of the data, which is transmitted to the database server 100 via the network. Further, the disk space 300 may include one or more disks 310 and 330 that may store data files. Further, the processor 111 may decide to separate the received data stream into the unit of the extent and store the data stream in one of one or more disks.

In the following text, extent as a series of data units having a size of 0 bit or more may denote a basic unit for storing data. For example, the extent may be configured as a size of 1 Mb, but the present disclosure is not limited thereto. The extent may include an original extent located in a first disk 310 before movement and a copy extent stored on a second disk 330 after movement.

The processor 111 may divide the data stream into extent units and allocate the data streams to one or more disks 310 and 330. Here, the one or more disks 310 and 330 may be at least one of disks included in the disk space 300. For example, when the processor 111 receives a data stream of "A, A', B, B', and C and C'" over the network, the processor 111 may divide the data stream into 6 of "A 311", "A' 331", "B 312", "B' 332", C 313, and C' 333 into 6 extents. Herein, each extent may have the size of 1 Mb. In addition, as illustrated in FIG. 2, the processor may allocate "A 311", "B 312", and "C 313" to the first disk 310 and "A' 331", "B' 332", and "C' 333" to the second disk 330. As a result, the processor 111 may divide the data stream and separately store the divided data streams in one or more disks 310 and 330. The detailed description of allocation and storage operations of the above-described extents is only an example, and the present disclosure is not limited thereto.

The memory 120 according to an exemplary embodiment of the present disclosure may store extent mapping information related to a location where each extent is stored. In another exemplary embodiment of the present disclosure, one of nodes constituting the database server may store the extent mapping information including information regarding a node where each extent is stored. More specifically, the processor 111 may store the extent mapping information for the location (e.g., a disk number and a storage location) where each extent is stored in an instance cache of the DB or on the memory 120. In addition, a worker thread of the processor 111 may access the extent based on the extent mapping information in order to perform work related to the extent.

Additionally, the database server 100 may include at least two or more nodes (computing devices) (not illustrated). The node may include a DBMS node and a storage manager node. Herein, the storage manager may be a separate node capable of generating or transmitting a command related to the operation of the DBMS 110. That is, the storage manager may be a node separated from the DBMS or it may be another instance which operates on the same computing device as the DBMS. More specifically, the database server 100 may include one or more processors 111. In addition, the DBMS 110 and the storage manager may be separate instances operated by processors different from each other, respectively. Further, herein, when the DBMS 110 manages the persistent storage medium 130, the storage manager may transmit a command (e.g., a move command for the extent) to control the DBMS to perform a predetermined operation to the DBMS 110. In addition, the storage manager may store and manage the extent mapping information in a separate buffer cache. Further, in some exemplary embodiments, the storage manager may be included in the database system 10 and configured to communicate with the database server 100 over the network as a computing device different from the database server 100.

The extent mapping information according to an exemplary embodiment of the present disclosure may include at least one of address information of the extent, state information of the extent, and a transaction sequence number of the extent. Here, the address information of the extent may include information for accessing the extent, such as the disk number and the storage location of the extent. In addition, the extent state information may be configured to indicate whether the extent is being performed (e.g., loading or loaded) or indicate whether the extent is accessible (e.g., read-only, read/write available, etc.). In addition, the transaction sequence number of the extent may be a predetermined time stamp, which is decided based on an occurrence time of the transaction for each extent. For example, the transaction sequence number may consist of eight hexadecimal digits and may be stored on the extent mapping information for each extent. The description of the configuration of the transaction sequence number is just an example and the present disclosure is not limited thereto. The detailed description of the extent mapping information is only an example, and the present disclosure is not limited thereto.

The transaction sequence number of the extent on the extent mapping information according to an exemplary embodiment of the present disclosure may be updated to a transaction sequence number of the worker thread performing the work related to the extent when the work related to the extent occurs.

More specifically, the processor 111 may manage the extent mapping information for each extent and the worker thread performing the work related to the extent. Then, the processor 111 may store the transaction sequence number decided based on an access time in items (one variable item in a header of the worker thread) included in the worker thread when the worker thread accesses a predetermined extent in order to perform the work. Further, when the work related to the extent occurs, the processor 111 may update the transaction sequence number of the extent to the transaction sequence number of the worker thread performing the work related to the extent. Accordingly, the processor 111 may store the transaction sequence number decided based on the time when the worker thread accesses the extent in the extent mapping information for the extent.

Accordingly, the processor 111 according to an exemplary embodiment of the present disclosure may determine whether there is writing work for the extent based on the extent mapping information. The detailed description thereof will be described below with reference to FIGS. 3 and 4.

Figure 3:
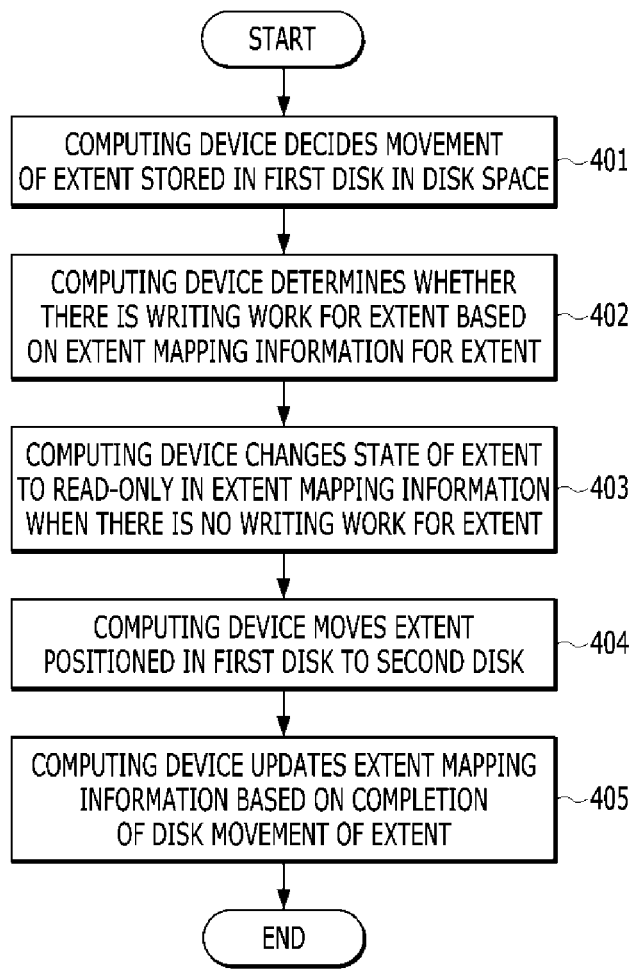
FIG. 3 is a full flow chart of a method for moving an extent according to an exemplary embodiment of the present disclosure.

FIG. 3 is a full flow chart of a method for moving an extent according to an exemplary embodiment of the present disclosure.

The extent movement according to an exemplary embodiment of the present disclosure may be performed by a computing device. Herein, the computing device may include one or more processors 111 and a memory storing commands executable by one or more processors. Hereinafter, an order in which the computing device moves the extents will be described in detail.

The computing device according to an exemplary embodiment of the present disclosure may decide movement of the extent stored in the first disk 310 in the disk space (401). Herein, the movement command for the extent may be received from an external client 200 or may be autonomously generated by the process of the DBMS when the process of the DBMS determines that the movement of the extent is required. In addition, according to another exemplary embodiment of the present disclosure, a move request for the extent may be received from the storage manager node that is different from the computing device.

More specifically, when a new disk is added to the disk space 300, one or more disks are removed, or an error occurs in one of at least two disks, the computing device may decide to move the extent stored in the first disk 310 to the second disk 330 for rebalancing. Herein, the disk space may include at least two disks 310 and 330. In addition, in another exemplary embodiment of the present disclosure, the database server may include the storage manager node when the database server is constituted by a plurality of nodes. Further, in another exemplary embodiment of the present disclosure, the disk space may include disks of different nodes, or may include a plurality of disks in one node.

More specifically, as a third disk (not illustrated) is added to the disk space 300, the computing device may decide to move some of extents 211, 212, 213, 231, 232, and 233 stored in the first and second disks 310 and 330 to the third disk (not illustrated). Accordingly, the computing device may perform the rebalancing between the disks by reallocating the extents between the disks. Here, the extent reallocation may be performed based on, for example, a capacity of each disk.

For example, the third disk (not illustrated) having a capacity of 10 Mb may be added to the disk space including the first disk 310 and the second disk 330 each having the capacity of 10 Mb. In this case, the computing device may decide to move "C 313" among the extents "A 311", "B 312", and "C 313" stored in the first disk 310 to the third disk (not illustrated) and move the extent "C' 333" stored in the second disk 330 to the third disk (not illustrated). The detailed description of the extent movement operation is only an example, and the present disclosure is not limited thereto.

The computing device according to an exemplary embodiment of the present disclosure may determine whether there is writing work for the extent based on the extent mapping information for the extent (402). Herein, an entry included in the extent mapping information may store the transaction sequence number decided based on a time at which the work performed for each extent starts.

More specifically, the computing device may separate the data streams into the extent units and allocate the separated data streams to one or more disks included in the disk space. In addition, the computing device may store the extent mapping information for each of the extents in a cache memory or in a main memory. Here, the extent mapping information may include at least one of the address information of the extent, the state information of the extent, and the transaction sequence number of the extent. Here, the transaction sequence number as a type of time stamp that increases in a time series may be changed over time.

The computing device may include the worker thread that performs the work related to the extent. Further, the computing device may store the transaction sequence number decided based on the access time in the items (e.g., one variable item in the header of the worker thread) included in the worker thread when the worker thread accesses a predetermined extent in order to perform the work. In addition, when the work related to the extent occurs, the computing device may update the transaction sequence number of the extent to the transaction sequence number of the worker thread performing the work related to the extent. Accordingly, the computing device may store the transaction sequence number decided based on the time when the worker thread accesses the extent in the entry of the extent mapping information for the extent.

As a result, the computing device may compare the transaction sequence number stored in the entry of the extent mapping information and the transaction sequence number stored in the worker thread being driven, respectively. In addition, according to whether there is the worker thread with the transaction sequence number which is small than or equal to the transaction sequence number of the extent mapping information, the computing device may determine that the work (e.g., writing work for the extent) for the extent is not present.

When the computing device according to an exemplary embodiment of the present disclosure determines that there is the work for the extent, the computing device may decide to switch the worker thread performing the movement work for the extent to the sleep state.

More specifically, the computing device may determine that there is the work for the extent when there is a worker thread with a transaction sequence number which is small than or equal to the transaction sequence number of the extent mapping information. In addition, the computing device may decide to switch the worker thread accessing to move the extent to a sleep state. Herein, the sleep state indicates waiting for the movement work of the extent and the computing device may decide to allow the worker thread to access the extent again after a predetermined time. Accordingly, the computing device may make the worker thread performing the movement work of the extent wait until the worker thread performing the writing work for the extent completes the writing work. The computing device determines the presence or absence of the work of the worker thread for the extent before the movement work of the extent and when the work for the extent is not present, the computing device perform the movement work to maintain consistency of the transaction.

When the writing work for the extent is not present, the computing device according to an exemplary embodiment of the present disclosure may change a state of the extent to read-only in the extent mapping information (403).

More specifically, the computing device compares the transaction sequence number of the extent mapping information and the transaction sequence number of the worker thread to determine whether the writing work for the extent is present. In addition, when there is no worker thread with the transaction sequence number which is small than or equal to the transaction sequence number of the extent mapping information, the computing device may determine that the writing work for the extent is not present. Further, the computing device may change the state information of the extents included in the extent mapping information to read-only. Herein, a read-only state which locks the writing work for the extent may allow the access of the worker thread for performing reading work.

The computing device according to an exemplary embodiment of the present disclosure may move the extent positioned in the first disk 310 to the second disk 330 (404). More specifically, the computing device may read and copy the original extent positioned in the first disk 310. In addition, the computing device may store the copy extent copied from the original extent in the second disk 330. Additionally, after the movement of the extent is completed and modification of the extent mapping information is completed, the computing device may delete the original extent positioned in the first disk 310. By deleting a pre-movement extent after the modification of the extent mapping information as well as the extent migration is completed, the method for moving an extent according to an embodiment of the present disclosure may efficiently manage the storage space of the computing device while maintaining the consistency.

When the writing work for the extent is completed, the computing device may modify the transaction sequence number of the extent mapping information to the transaction sequence number of the worker thread. More specifically, the computing device may initialize the transaction sequence number of the worker thread when the writing work of the worker thread for the extent is completed. Herein, the initialization of the transaction sequence number may be a change to the transaction sequence number at the time of completion of the work. Additionally, the initialization of the transaction sequence number may mean a change to a predetermined value (e.g., "FFFFFFFF" in hexadecimal 8-digit number). The predetermined value is just an example and the present disclosure is not limited thereto.

The computing device according to an exemplary embodiment of the present disclosure may update the extent mapping information based on completion of disk movement of the extent (405). In addition, in some exemplary embodiments, when the disk movement of the extent is completed, the computing device may determine whether there is the work for the extent. Further, when there is the work for the extent, the computing device may change the extent state of the extent mapping information to an in-use state and update the extent mapping information by waiting for the completion of the work or update the extent mapping information when there is no work for the extent, (405).

More specifically, the computing device may store on a cache the entry of the extent mapping information for each extent. Herein, the extent mapping information may include at least one of the address information (e.g., disk number, etc.) of the extent, the state information of the extent, and the transaction sequence number of the extent. Further, the transaction sequence number as a type of time stamp that increases in a time series may be changed over time. The computing device may then store the transaction sequence number decided based on the access time in the items included in the worker thread accessing for the movement work for the extent. In addition, when the movement work for the extent occurs, the computing device may update the transaction sequence number of the extent to the transaction sequence number of the worker thread performing the movement work for the extent. Accordingly, the computing device may store the transaction sequence number decided based on the time when the worker thread accesses the extent in the entry of the extent mapping information for the extent.

The computing device may compare the transaction sequence number stored in the entry of the extent mapping information and the transaction sequence number stored in the worker thread being driven, respectively. In addition, according to whether there is the worker thread with the transaction sequence number which is small than or equal to the transaction sequence number of the extent mapping information, the computing device may determine whether the work (e.g., reading or writing work for the extent) for the extent is present. More specifically, the computing device may determine that there is the work for the extent when there is a worker thread with a transaction sequence number which is small than or equal to the transaction sequence number of the extent mapping information. On the contrary, the computing device may determine that there is no work for the extent when there is no worker thread with a transaction sequence number which is small than or equal to the transaction sequence number of the extent mapping information.

The computing device may change the extent state included in the extent mapping information to loading when there is the work for the extent. In addition, the computing device may change the extent state to loaded when there is no work on the extent or after the completion of the work. The computing device may then wait for an update to the extent mapping information until the extent state is changed to loaded. In an exemplary embodiment of the present disclosure, when there is the work (e.g., a reading work, etc.) for the extent, in a situation where the extent is stored in an existing storage location and a moved storage location, by waiting for the update of the extent mapping information including information for accessing the extent, the work for the extent may be performed on the extent stored in the existing storage location, thereby minimizing downtime due to the movement of the extents.

When the extent state of the extent mapping information is loading, the computing device according to an exemplary embodiment of the present disclosure may switch the worker thread accessing the extent mapping information to a standby state and write the worker thread in a standby list. More specifically, the computing device may decide to allow the access of the worker thread based on the extent state included in the extent mapping information. Herein, the extent state may be loading or loaded and may be configured in a form of read-only or read/write available for indicating whether the extent is accessible.

The computing device may decide to suspend the operation of the worker thread when the worker thread accesses the extent in which the extent state is loading. In addition, the computing device may create the standby list on the cache and stack one or more worker threads of which operations are suspended in order. Herein, the standby list may be created for each extent, created for each disk, or created as one standby list for the entire disk space. Further, the computing device may reconfirm the extent state after a predetermined time and decide to resume the operation of the worker thread when the extent state is loaded.

As a result, the method for moving an extent according to an exemplary embodiment of the present disclosure may minimize a time for which a read request is blocked in an operation of moving the extent. Further, by comparing only the transaction sequence numbers of the entry and the worker thread, it is possible to determine whether the extent is worked, thereby reducing a memory usage.

Then, since the extent movement work is performed by judging whether the writing work is being performed for each extent, the consistency of data may be maintained. Further, when I/O work for the extent is being performed, it is possible to wait for the update of the extent mapping information, thereby preventing duplication and the error of data.

The method for moving an extent according to an exemplary embodiment of the present disclosure performs work of replicating the extent to another storage location while allowing the reading work for the extent, thereby minimizing the time for which the reading work for the extent is blocked. In addition, the method for moving an extent according to an exemplary embodiment of the present disclosure checks the existence of the reading work for the extent and updates the extent mapping information indicating the storage location of the extent only when there is no work, thereby maintaining the consistency. That is, the method for moving an extent according to an exemplary embodiment of the present disclosure may maintain the consistency while minimizing the time for which the reading and writing work for the extent is blocked, thereby enhancing performance of a database computer device.

Figure 4:
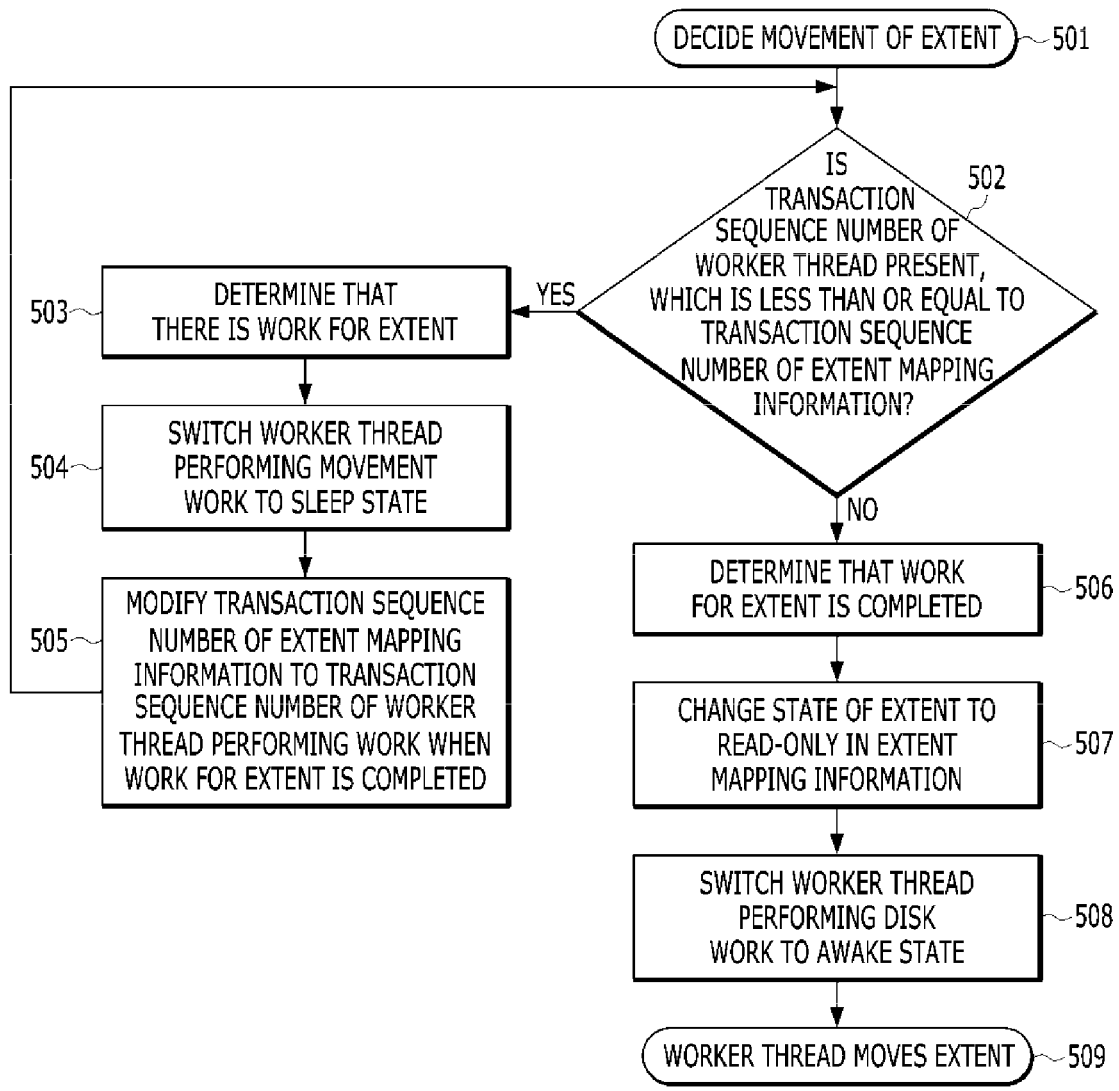
FIG. 4 is a partial flow chart from reception of a movement command of an extent up to completion of movement of the extent according to an exemplary embodiment of the present disclosure.

FIG. 4 is a partial flow chart from reception of a movement command of extent up to completion of movement of the extent according to an exemplary embodiment of the present disclosure.

The computing device according to an exemplary embodiment of the present disclosure may decide movement of the extent stored in the first disk (501). Herein, the movement of the extent may be decided for rebalancing when a new disk is added to the disk space 300, one or more disks are removed, or the error occurs on one of at least two disks. The description of a situation in which the movement of the extent is decided is just an example and the present disclosure is not limited thereto.

More specifically, when a new disk is added to disk space 300, one or more disks are removed, or an error occurs in one of at least two disks, the computing device may decide to move the extent stored in the first disk 310 to the second disk 330 for rebalancing. Herein, the disk space may include at least two disks 310 and 330. Further, in some exemplary embodiments, the computing device may include the DBMS processor and the storage manager node. In addition, the storage manager node may transmit a command related to the extent movement to the DBMS processor.

The extent mapping information according to an exemplary embodiment of the present disclosure may include at least one of address information of the extent, state information of the extent, and a transaction sequence number of the extent. In addition, the extent mapping information may be configured for each extent and stored in at least one of the cache, the memory, and an external storage manager.

Herein, the address information of the extent may include information for accessing the extent, such as the disk number and the storage location of the extent. In addition, the extent state information may be configured to indicate whether the work for the extent is being performed (e.g., loading or loaded) or indicate whether the extent is accessible (e.g., read-only, read/write available, etc.). In addition, the transaction sequence number of the extent may be a predetermined format of time stamp, which is decided based on an occurrence time of the transaction for each extent.

According to an exemplary embodiment of the present disclosure, the transaction sequence number of the extent may be configured for each extent and stored in the entry on the extent mapping information. Further, the computing device may store the transaction sequence number in the worker thread when the worker thread accesses the extent for the work. In addition, when the work related to the extent occurs, the transaction sequence number of the extent may be updated to the transaction sequence number of the worker thread performing the work related to the extent. Accordingly, each entry on the extent mapping information may store the transaction sequence number of the worker thread accessing to perform the work for the extent. The processor compares the transaction sequence number of the extent mapping information and the transaction sequence number of the worker thread through the update of the transaction sequence number to determine whether the work for the extent is present.

The computing device may confirm the transaction sequence number stored in each of the worker threads. Herein, the computing device may determine whether there is the transaction sequence number of the worker thread is smaller than or equal to the transaction sequence number of the extent mapping information (502).

First, the computing device may determine that there is the work for the extent when there is the transaction sequence number of the worker thread is smaller than or equal to the transaction sequence number of the extent mapping information (503).

In such a case, the computing device may switch the worker thread (i.e., the worker thread performing the extent movement work) accessing for moving the extent to a sleep state (504). Herein, the sleep state indicates waiting for the movement of the extent and the computing device may decide to allow the worker thread to access the extent again after a predetermined time. Accordingly, the computing device may make the worker thread performing the movement work of the extent to wait until the worker thread performing the writing work for the extent completes the writing work.

When the writing work for the extent is completed, the computing device may modify the transaction sequence number of the extent mapping information to the transaction sequence number of the worker thread (i.e., a worker thread performing the writing work for the extent) (505).

More specifically, the computing device may initialize the transaction sequence number of the worker thread when the writing work of the worker thread for the extent is completed. Herein, the initialization of the transaction sequence number may be a change to the transaction sequence number at the time of completion of the work. Additionally, the initialization of the transaction sequence number may mean a change to a predetermined value (e.g., "FFFFFFFF" in hexadecimal 8-digit number).

First, the computing device may determine that the writing work for the extent is completed when there is no transaction sequence number of the worker thread less than or equal to the transaction sequence number of the extent mapping information (506).

In such a case, the computing device may change the state information of the extents included in the extent mapping information to read-only (507). Herein, a read-only state which locks the writing work for the extent may allow the access of the worker thread for performing reading work.

The computing device may switch the worker thread performing the movement work of the extent that is in the sleep state to an awake state (508). Herein, the awake state means a state in which the movement work for the extent is performed or may be performed and the computing device may resume the movement work of the worker thread.

The computing device may allow the worker thread performing the extent movement work to move the extent position in the first disk 310 to the second disk 330 (509). More specifically, the computing device may allow the worker thread corresponding to the extent movement work to copy the original extent in the first disk 310. In addition, the computing device may allow the worker thread to store the copy extent copied from the original extent in the second disk 330. Additionally, the computing device may allow the worker thread to delete the original extent positioned in the first disk 310 after the copy extent is stored in the second disk 330.

For example, the extents "A 311", "B 312", and "C 313" may be stored in the first disk 310 as illustrated in FIG. 2. In addition, the computing device may receive a command for moving the extents "A 311", "B 312", and "C 313" to the second disk 330. Accordingly, the computing device may confirm the transaction sequence number constituted by the hexadecimal 8-digit number of the extent mapping information corresponding to "A 311", "B 312", and "C 313" and compare the transaction sequence number of the worker thread which is in operation with the configured transaction sequence number. Herein, the transaction sequence number for "A 311" may be "2018AA99", the transaction sequence number for "B 312" may be "2018AB00", and the transaction sequence number for "C 313" may be "2018DD80". In addition, one worker thread having the smallest transaction sequence number among the worker threads which are in operation may include a transaction sequence number "2018AB12". Accordingly, the computing device may determine that there is writing work corresponding to the extent "C 313" and determine that there is no writing work corresponding to "A 311" and "B 312". In addition, the computing device may cause the worker thread for the extent movement work to perform the movement work for the extents "A 311" and "B 312". Further, the computing device may switch the worker thread for the movement work for the extent "C 313" to the sleep state. Then, the computing device may allow the worker thread to attempt to access the extent "C 313" at an interval of ¹⁄₁₀₀ second to confirm the end of the movement work. Further, the computing device may switch the worker thread in the sleep state to the awake state when the writing work for "C 313" is completed. As a result, the computing device may move the extents "A 311", "B 312", and "C 313" positioned in the first disk 310 to the second disk 330 and store the extents as "A' 331", "B' 332", and "C' 333". The detailed description of a determination operation of the existence of the writing work for the extent and the movement work of the worker thread is just an example and the present disclosure is not limited thereto.

Accordingly, in the method for moving an extent according to an exemplary embodiment of the present disclosure, in the operation of moving the extent, since the extent movement work is performed by determining whether the writing work is performed for each extent, the consistency of the data may be maintained.

By changing the state of the extent included in the extent mapping information to read-only, it is possible to minimize the time for which the read request is blocked. Further, by comparing only the transaction sequence numbers of the entry and the worker thread, it is possible to determine whether the extent is worked, thereby reducing a memory usage.

Figure 5:
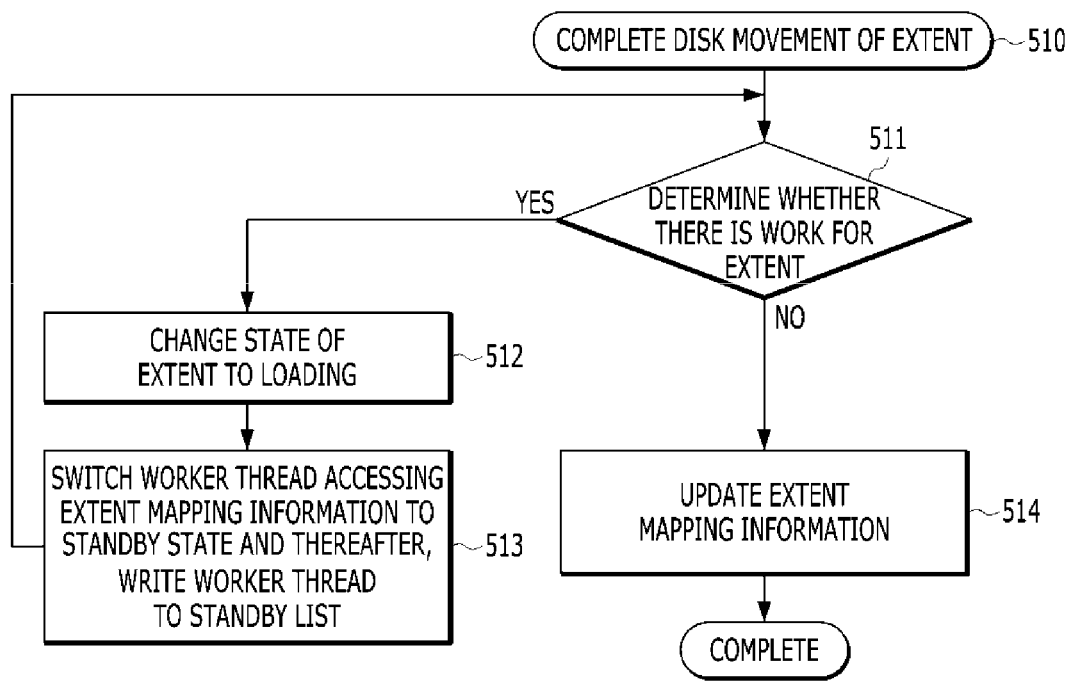
FIG. 5 is a partial flow chart from the completion of the movement of the extent up to resumption of writing work for the extent according to an exemplary embodiment of the present disclosure.

FIG. 5 is a partial flow chart from the completion of the movement of the extent up to resumption of writing work for the extent according to an exemplary embodiment of the present disclosure.

The computing device according to an exemplary embodiment of the present disclosure may update the extent mapping information based on completion of disk movement of the extent (510). More specifically, when the disk movement of the extent is completed, the computing device may determine whether there is the work for the extent. In addition, when there is the work for the extent, the computing device may change the extent state of the extent mapping information to the in-use state and update the extent mapping information by waiting for completion of the work. On the contrary, when there is no work for the extent, the computing device may update the extent mapping information (514).

Herein, the operation of the computing device of determining whether there is the work for the extent may be performed by comparing the stored transaction sequence number of the extent mapping information with the transaction sequence number stored in the worker thread as described above with reference to FIG. 4. More specifically, the computing device may store on a cache the entry of the extent mapping information for each extent. Herein, the extent mapping information may include at least one of the address information (e.g., disk number, etc.) of the extent, the state information of the extent, and the transaction sequence number of the extent. Further, the transaction sequence number as a type of time stamp that increases in a time series may be changed over time. The computing device may then store the transaction sequence number decided based on the access time in the items included in the worker thread accessing for the movement work for the extent. In addition, when the movement work for the extent occurs, the computing device may update the transaction sequence number of the extent to the transaction sequence number of the worker thread performing the movement work for the extent. Accordingly, the computing device may store the transaction sequence number decided based on the time when the worker thread accesses the extent in the entry of the extent mapping information for the extent.

The computing device may compare the transaction sequence number stored in the entry of the extent mapping information and the transaction sequence number stored in the worker thread being driven, respectively. In addition, according to whether there is the worker thread with the transaction sequence number which is small than or equal to the transaction sequence number of the extent mapping information, the computing device may determine whether the work (e.g., reading or writing work for the extent) for the extent is present (511). More specifically, the computing device may determine that there is the work for the extent when there is a worker thread with a transaction sequence number which is small than or equal to the transaction sequence number of the extent mapping information. On the contrary, the computing device may determine that there is no work for the extent when there is no worker thread with a transaction sequence number which is small than or equal to the transaction sequence number of the extent mapping information.

The computing device may change the extent state included in the extent mapping information to loading when there is the work for the extent (512). In addition, the computing device may change the extent state to loaded when there is no work on the extent or after the completion of the work. The computing device may then wait for an update to the extent mapping information until the extent state is changed to loaded.

When the extent state of the extent mapping information is loading, the computing device according to an exemplary embodiment of the present disclosure may switch the worker thread accessing the extent mapping information to a standby state and write the worker thread in a standby list (513). More specifically, the computing device may decide to allow the access of the worker thread based on the extent state included in the extent mapping information. Herein, the extent state may be loading or loaded for indicating whether the work for the extent is performed. The extent state may be configured in a form of read-only or read/write available for indicating whether to be accessible to the extent.

The computing device may decide to suspend the operation of the worker thread when the worker thread accesses the extent in which the extent state is loading. In addition, the computing device may create the standby list on the cache and stack one or more worker threads of which operations are suspended in order. Herein, the standby list may be created for each extent, created for each disk, or created as one standby list for the entire disk space 300. Further, the computing device may reconfirm the extent state after a predetermined time and decide to resume the operation of the worker thread the extent state is loaded.

Additionally, the computing device may store the transaction sequence number decided based on the access time in the worker thread accessing the extent of which extent state is loading. In addition, the computing device may decide the order of the standby list by comparing the sizes of the transaction sequence numbers stored in the respective worker threads. For example, when a first worker thread and a second worker thread access the extent of which extent state is loading, the first worker thread stores a transaction sequence number "201812FF" in a header thereof and the second worker thread may store a transaction sequence number "201870AB" in the header thereof based on respective access time. In addition, the operations of the first worker thread and the second worker thread are held by the computing device and stored in the standby list on the cache. In this case, the computing device compares the transaction sequence number "201812FF" of the first worker thread and the transaction sequence number "201870AB" of the second worker thread to decide to process the first worker thread storing the smaller transaction sequence number in a higher priority than the second worker thread. The detailed description of the values of the transaction sequence numbers and the standby list is only an example and the present disclosure is not limited thereto.

As a result, the method for moving an extent according to an exemplary embodiment of the present disclosure may minimize a time for which a red request is blocked in an operation of moving the extent. Further, by comparing only the transaction sequence numbers of the entry and the worker thread, it is possible to determine whether the extent is worked, thereby reducing a memory usage.

Then, since the extent movement work is performed by judging whether the writing work is being performed for each extent, the consistency of data may be maintained. Further, when I/O work for the extent is being performed, it is possible to wait for the update of the extent mapping information, thereby preventing duplication and the error of data.

Figure 6:
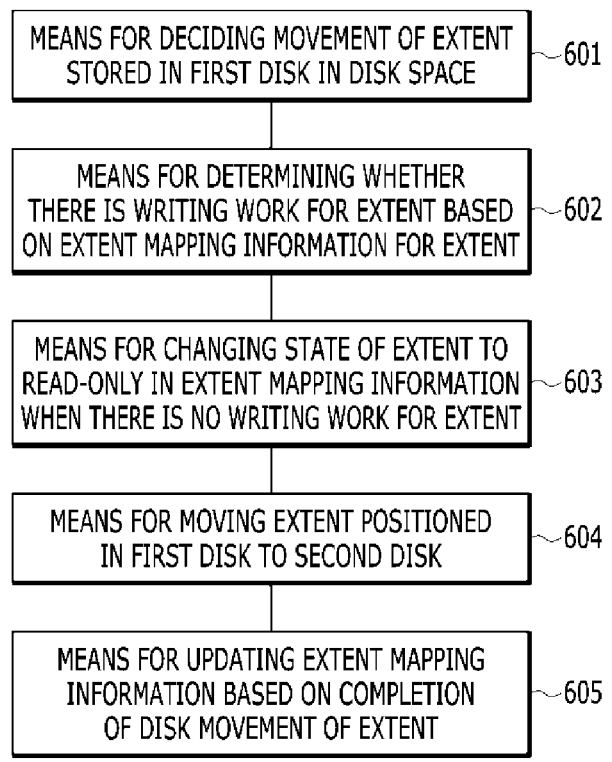
FIG. 6 is a flow chart illustrating a means for moving an extent in a database system according to an exemplary embodiment of the present disclosure.

FIG. 6 is a flow chart illustrating a means for moving an extent in a database system 10 according to an exemplary embodiment of the present disclosure.

A means for moving an extent may include a means 601 for deciding, one or more processors of a computing device, movement of an extent stored in a first disk in a disk space in which the disk space includes at least two disks; a means 602 for determining, by the processor, whether there is writing work for the extent based on extent mapping information for the extent, a means 603 for changing, by the processor, a state of the extent to read-only in the extent mapping information when there is no writing work for the extent, a means 604 for moving, by the processor, the extent positioned in the first disk to a second disk, and a means 605 for updating, by the processor, the extent mapping information based on completion of the disk movement of the extent.

Alternatively, the extent mapping information may be configured for each extent and may include at least one information of address information of the extent, state information of the extent, and a transaction sequence number of the extent.

Alternatively, when the work for the extent occurs, the transaction sequence number of the extent may be updated to the transaction sequence number of a worker thread performing the work for the extent.

Alternatively, the means for determining, by the processor, whether there is the writing work for the extent based on the extent mapping information for the extent may include a means for determining, by the processor, that there is the writing work for the extent when there is the worker thread transaction sequence number less than or equal to the transaction sequence number of the extent mapping information by comparing the transaction sequence number of the extent mapping information and the transaction sequence number of the worker thread and a means for switching the worker thread performing the movement work for the extent to a sleep state when there is the writing work for the extent.

Alternatively, the means may further include a means for modifying, when the writing work for the extent is completed, the transaction sequence number of the extent mapping information to the transaction sequence number of the worker thread.

Alternatively, the means for updating, by the processor, the extent mapping information based on the completion of the disk movement of the extent may include a means for determining, by the processor, whether there is the work for the extent when the disk movement of the extent is completed and a means for changing an extent state of the extent mapping information to loading when there is the work for the extent, updating the extent mapping information by waiting for the completion of the work, or updating the extent mapping information when there is no work for the extent.

Alternatively, when the extent state of the extent mapping information is loading, the worker thread accessing the extent mapping information may be switched to a standby state and written in a standby list.

Alternatively, a movement command for the extent stored in the first disk may be created for rebalancing when a new disk is added to the disk space, the one or more disks are removed, or an error occurs in one of the at least two disks.

Alternatively, the means may further include a means for resuming, by the processor, the writing work for the extent based on the update of the extent mapping information.

Alternatively, the means may further include a means for deleting, by the processor, the extent positioned in the first disk.

Figure 7:
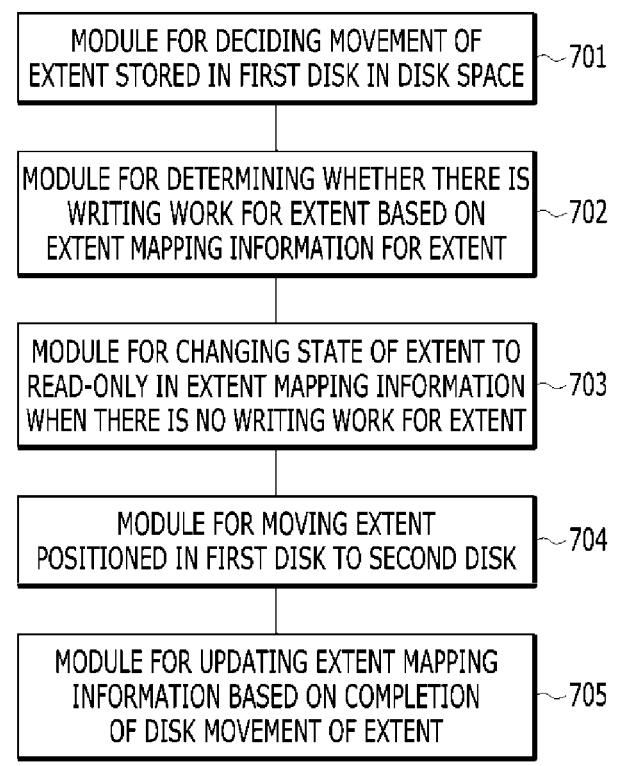
FIG. 7 is a flow chart illustrating modules for moving an extent in a database system according to an exemplary embodiment of the present disclosure.

FIG. 7 is a flow chart illustrating a module for moving an extent in a database system 10 according to an exemplary embodiment of the present disclosure.

The method for moving an extent in a database system 10 according to an exemplary embodiment of the present disclosure may be implemented by the following modules.

According to an exemplary embodiment of the present disclosure, the database system 10 may include a module 701 for deciding movement of an extent stored in a first disk in a disk space in which the disk space includes at least two disks; a module 702 for determining, by the processor, whether there is writing work for the extent based on extent mapping information for the extent, a module 703 for changing, by the processor, a state of the extent to read-only in the extent mapping information when there is no writing work for the extent, a module 704 for moving, by the processor, the extent positioned in the first disk to a second disk, and a module 705 for updating, by the processor, the extent mapping information based on completion of the disk movement of the extent.

Figure 8:
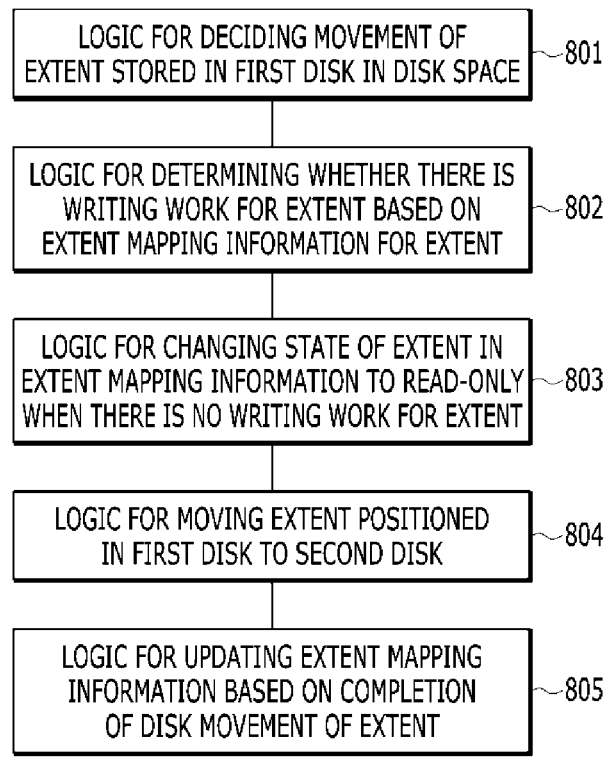
FIG. 8 is a flow chart illustrating logic for moving an extent in a database system according to an exemplary embodiment of the present disclosure.

FIG. 8 is a flow chart illustrating logic for moving an extent in a database system 10 according to an exemplary embodiment of the present disclosure.

The method for moving an extent in a database system 10 according to an exemplary embodiment of the present disclosure may be implemented by the following logics.

According to an exemplary embodiment of the present disclosure, the database system 10 may include a logic 801 for deciding movement of an extent stored in a first disk in a disk space in which the disk space includes at least two disks; a logic 802 for determining, by the processor, whether there is writing work for the extent based on extent mapping information for the extent, a logic 803 for changing, by the processor, a state of the extent to read-only in the extent mapping information when there is no writing work for the extent, a logic 804 for moving, by the processor, the extent positioned in the first disk to a second disk, and a logic 805 for updating, by the processor, the extent mapping information based on completion of the disk movement of the extent.

Figure 9:
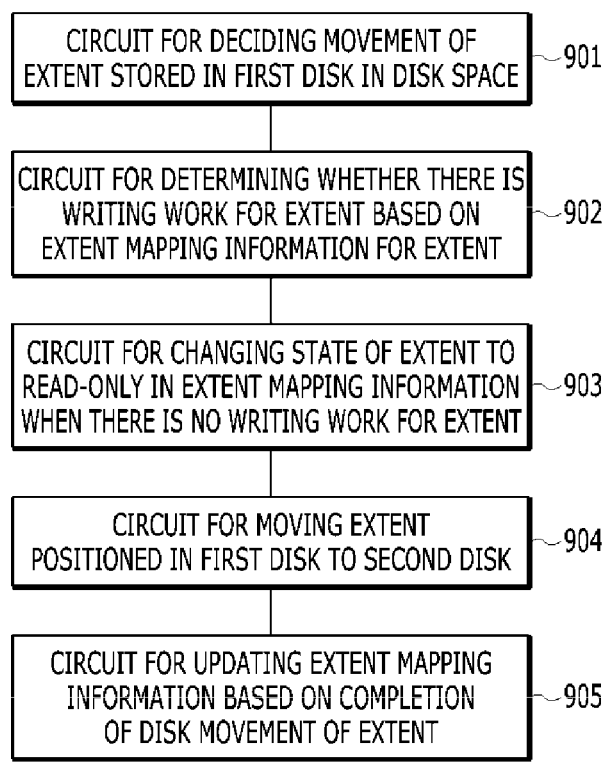
FIG. 9 is a flow chart illustrating a circuit for moving an extent in a database system according to an exemplary embodiment of the present disclosure.

FIG. 9 is a flow chart illustrating a circuit for moving an extent in a database system 10 according to an exemplary embodiment of the present disclosure.

The method for moving an extent in a database system 10 according to an exemplary embodiment of the present disclosure may be implemented by the following circuits.

According to an exemplary embodiment of the present disclosure, the database system 10 may include a circuit 901 for deciding movement of an extent stored in a first disk in a disk space in which the disk space includes at least two disks; a circuit 902 for determining, by the processor, whether there is writing work for the extent based on extent mapping information for the extent, a circuit 903 for changing, by the processor, a state of the extent to read-only in the extent mapping information when there is no writing work for the extent, a circuit 904 for moving, by the processor, the extent positioned in the first disk to a second disk, and a circuit 905 for updating, by the processor, the extent mapping information based on completion of the disk movement of the extent.

Those skilled in the art needs to recognize that various illustrative logical blocks, configurations, modules, circuits, means, logic, and algorithm steps described in connection with the exemplary embodiments disclosed herein may be additionally implemented as electronic hardware, computer software, or combinations of both sides. To clearly illustrate the interchangeability of hardware and software, various illustrative components, blocks, structures, means, logic, modules, circuits, and steps have been described above generally in terms of their functionalities. Whether the functionalities are implemented as the hardware or software depends on a specific application and design restrictions given to an entire system. Skilled artisans may implement the described functionalities in various ways for each particular application, but such implementation decisions should not be interpreted as causing a departure from the scope of the present disclosure.

Figure 10:
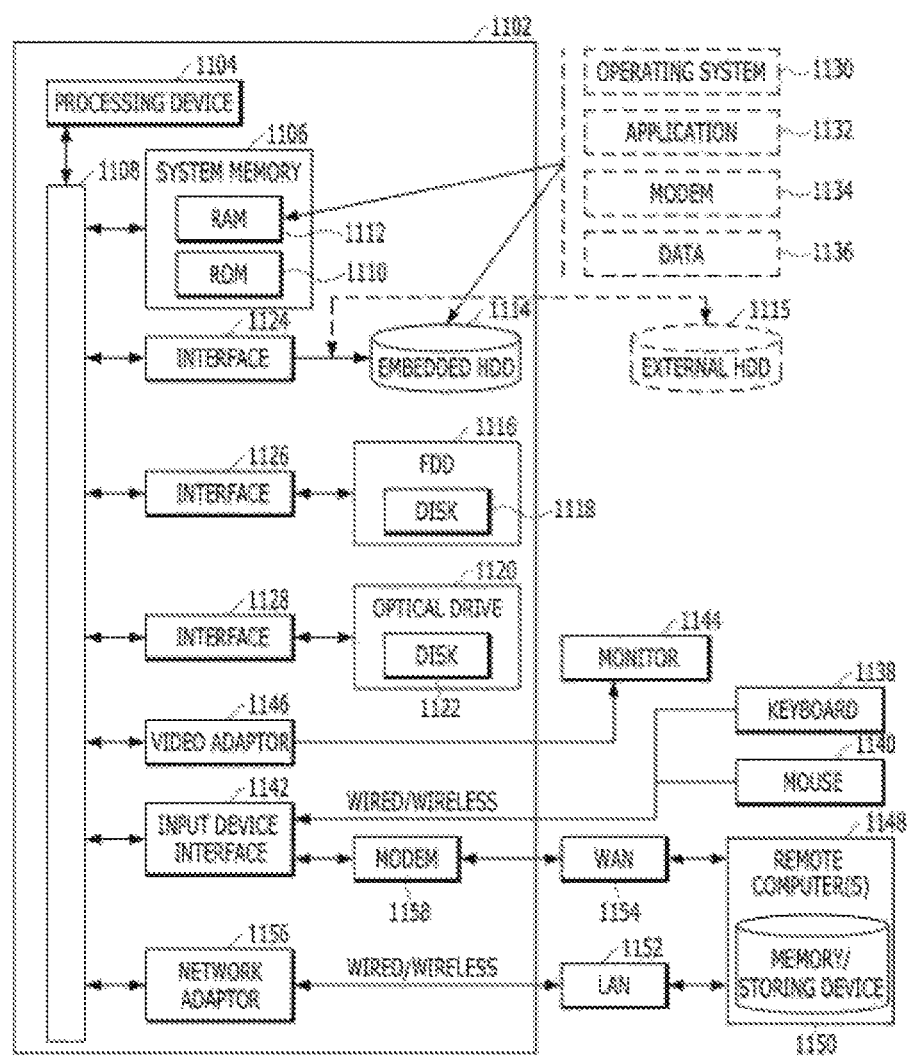
FIG. 10 is a block diagram of a computing device according to an exemplary embodiment of the present disclosure.

FIG. 10 is a block diagram of a computing device according to an exemplary embodiment of the present disclosure.

FIG. 10 illustrates a simple and general schematic view of an exemplary computing environment in which the exemplary embodiments of the present disclosure may be implemented.

The present disclosure has generally been described above in association with a computer executable command which may be executed on one or more computers, but it will be well appreciated by those skilled in the art that the present disclosure can be implemented through a combination with other program modules and/or a combination of hardware and software.

In general, the program module includes a routine, a program, a component, a data structure, and the like that execute a specific task or implement a specific abstract data type. Further, it will be well appreciated by those skilled in the art that the method of the present disclosure can be implemented by other computer system configurations including a personal computer, a handheld computing device, microprocessor-based or programmable home appliances, and others (the respective devices may operate in connection with one or more associated devices as well as a single-processor or multi-processor computer system, a mini computer, and a main frame computer.

The exemplary embodiments described in the present disclosure may also be implemented in a distributed computing environment in which predetermined tasks are performed by remote processing devices connected through a communication network. In the distributed computing environment, the program module may be positioned in both local and remote memory storage devices.

The computer generally includes various computer readable media. Media accessible by the computer may be computer readable media regardless of types thereof and the computer readable media include volatile and non-volatile media, transitory and non-transitory media, and mobile and non-mobile media. As not a limit but an example, the computer readable media may include both computer readable storage media and computer readable transmission media. The computer readable storage media include volatile and non-volatile media, temporary or non-temporary media, and movable and non-movable media implemented by a predetermined method or technology for storing information such as a computer readable command, a data structure, a program module, or other data. The computer storage media include a RAM, a ROM, an EEPROM, a flash memory or other memory technologies, a CD-ROM, a digital video disk (DVD) or other optical disk storage devices, a magnetic cassette, a magnetic tape, a magnetic disk storage device or other magnetic storage devices or predetermined other media which may be accessed by the computer or may be used to store desired information, but are not limited thereto.

The computer readable transmission media generally implement the computer readable command, the data structure, the program module, or other data in a carrier wave or a modulated data signal such as other transport mechanism and include all information transfer media. The term "modulated data signal" means a signal acquired by configuring or changing at least one of characteristics of the signal so as to encode information in the signal. As an example rather than a limit, the computer readable transmission media include wired media such as a wired network or a direct-wired connection and wireless media such as acoustic, RF, infrared and other wireless media. A combination of any media among the aforementioned media is also included in a range of the computer readable transmission media.

An exemplary environment 1100 that implements various aspects of the present disclosure including a computer 1102 is shown and the computer 1102 includes a processing device 1104, a system memory 1106, and a system bus 1108. The system bus 1108 connects system components including the system memory 1106 (not limited thereto) to the processing device 1104. The processing device 1104 may be a predetermined processor among various commercial processors. A dual processor or other multi-processor architectures may also be used as the processing device 1104.

The system bus 1108 may be any one of several types of bus structures which may be additionally interconnected to a local bus using any one of a memory bus, a peripheral device bus, and various commercial bus architectures. The system memory 1106 includes a read only memory (ROM) 1110 and a random access memory (RAM) 1112. A basic input/output system (BIOS) is stored in the non-volatile memories 1110 including the ROM, the EPROM, the EEPROM, and the like and the BIOS includes a basic routine that assists in transmitting information among components in the computer 1102 at a time such as in-starting. The RAM 1112 may also include a high-speed RAM including a static RAM for caching data, and the like.

The computer 1102 also includes an interior hard disk drive (HDD) 1114 (for example, EIDE and SATA), in which the interior hard disk drive 1114 may also be configured for an exterior purpose in an appropriate chassis (not illustrated), a magnetic floppy disk drive (FDD) 1116 (for example, for reading from or writing in a mobile diskette 1118), and an optical disk drive 1120 (for example, for reading a CD-ROM disk 1122 or reading from or writing in other high-capacity optical media such as the DVD, and the like). The hard disk drive 1114, the magnetic disk drive 1116, and the optical disk drive 1120 may be connected to the system bus 1108 by a hard disk drive interface 1124, a magnetic disk drive interface 1126, and an optical drive interface 1128, respectively. An interface 1124 for implementing an exterior drive includes at least one of a universal serial bus (USB) and an IEEE 1394 interface technology or both of them.

The drives and the computer readable media associated therewith provide non-volatile storage of the data, the data structure, the computer executable command, and others. In the case of the computer 1102, the drives and the media correspond to storing of predetermined data in an appropriate digital format. In the description of the computer readable media, the mobile optical media such as the HDD, the mobile magnetic disk, and the CD or the DVD are mentioned, but it will be well appreciated by those skilled in the art that other types of media readable by the computer such as a zip drive, a magnetic cassette, a flash memory card, a cartridge, and others may also be used in an exemplary operating environment and further, the predetermined media may include computer executable commands for executing the methods of the present disclosure.

Multiple program modules including an operating system 1130, one or more application programs 1132, other program module 1134, and program data 1136 may be stored in the drive and the RAM 1112. All or some of the operating system, the application, the module, and/or the data may also be cached by the RAM 1112. It will be well appreciated that the present disclosure may be implemented in various operating systems which are commercially usable or a combination of the operating systems.

A user may input commands and information in the computer 1102 through one or more wired/wireless input devices, for example, pointing devices such as a keyboard 1138 and a mouse 1140. Other input devices (not illustrated) may include a microphone, an IR remote controller, a joystick, a game pad, a stylus pen, a touch screen, and others. These and other input devices are often connected to the processing device 1104 through an input device interface 1142 connected to the system bus 1108, but may be connected by other interfaces including a parallel port, an IEEE 1394 serial port, a game port, a USB port, an IR interface, and others.

A monitor 1144 or other types of display devices are also connected to the system bus 1108 through interfaces such as a video adapter 1146, and the like. In addition to the monitor 1144, the computer generally includes a speaker, a printer, and other peripheral output devices (not illustrated).

The computer 1102 may operate in a networked environment by using a logical connection to one or more remote computers including remote computer(s) 1148 through wired and/or wireless communication. The remote computer(s) 1148 may be a workstation, a computer device computer, a router, a personal computer, a portable computer, a micro-processor based entertainment apparatus, a peer device, or other general network nodes and generally includes multiple components or all of the components described with respect to the computer 1102, but only a memory storage device 1150 is illustrated for brief description. The illustrated logical connection includes a wired/wireless connection to a local area network (LAN) 1152 and/or a larger network, for example, a wide area network (WAN) 1154. The LAN and WAN networking environments are general environments in offices and companies and facilitate an enterprise-wide computer network such as Intranet, and all of them may be connected to a worldwide computer network, for example, the Internet.

When the computer 1102 is used in the LAN networking environment, the computer 1102 is connected to a local network 1152 through a wired and/or wireless communication network interface or an adapter 1156. The adapter 1156 may facilitate the wired or wireless communication to the LAN 1152 and the LAN 1152 also includes a wireless access point installed therein in order to communicate with the wireless adapter 1156. When the computer 1102 is used in the WAN networking environment, the computer 1102 may include a modem 1158 or has other means that configure communication through the WAN 1154 such as connection to a communication computing device on the WAN 1154 or connection through the Internet. The modem 1158 which may be an internal or external and wired or wireless device is connected to the system bus 1108 through the serial port interface 1142. In the networked environment, the program modules described with respect to the computer 1102 or some thereof may be stored in the remote memory/storage device 1150. It will be well known that illustrated network connection is exemplary and other means configuring a communication link among computers may be used.

The computer 1102 performs an operation of communicating with predetermined wireless devices or entities which are disposed and operated by the wireless communication, for example, the printer, a scanner, a desktop and/or a portable computer, a portable data assistant (PDA), a communication satellite, predetermined equipment or place associated with a wireless detectable tag, and a telephone. This at least includes wireless fidelity (Wi-Fi) and a Bluetooth wireless technology. Accordingly, communication may be a predefined structure like the network in the related art or just ad hoc communication between at least two devices.

The Wi-Fi enables connection to the Internet, and the like without a wired cable. The Wi-Fi is a wireless technology such as a device, for example, a cellular phone which enables the computer to transmit and receive data indoors or outdoors, that is, anywhere in a communication range of a base station. The Wi-Fi network uses a wireless technology called IEEE 802.11(a, b, g, and others) in order to provide safe, reliable, and high-speed wireless connection. The Wi-Fi may be used to connect the computers to each other or the Internet and the wired network (using IEEE 802.3 or Ethernet). The Wi-Fi network may operate, for example, at a data rate of 11 Mbps (802.11a) or 54 Mbps (802.11b) in unlicensed 2.4 and 5 GHz wireless bands or operate in a product including both bands (dual bands).

It will be appreciated by those skilled in the art that information and signals may be expressed by using various different predetermined technologies and techniques. For example, data, instructions, commands, information, signals, bits, symbols, and chips which may be referred in the above description may be expressed by voltages, currents, electromagnetic waves, magnetic fields or particles, optical fields or particles, or predetermined combinations thereof.

It may be appreciated by those skilled in the art that various exemplary logical blocks, modules, processors, means, circuits, and algorithm steps described in association with the embodiments disclosed herein may be implemented by electronic hardware, various types of programs or design codes (for easy description, herein, designated as "software"), or a combination of all of them. In order to clearly describe the intercompatibility of the hardware and the software, various exemplary components, blocks, modules, circuits, and steps have been generally described above in association with functions thereof. Whether the functions are implemented as the hardware or software depends on design restrictions given to a specific application and an entire system. Those skilled in the art of the present disclosure may implement functions described by various methods with respect to each specific application, but it should not be analyzed that the implementation determination departs from the scope of the present disclosure.

Further, various embodiments presented herein may be implemented as manufactured articles using a method, an apparatus, or a standard programming and/or engineering technique. The term "manufactured article" includes a computer program, a carrier, or a medium which is accessible by a predetermined computer-readable device. Herein, the media may include storage media and transmission media. For example, a computer-readable storage medium includes a magnetic storage device (for example, a hard disk, a floppy disk, a magnetic strip, or the like), an optical disk (for example, a CD, a DVD, or the like), a smart card, and a flash memory device (for example, an EEPROM, a card, a stick, a key drive, or the like), but is not limited thereto. Further, various storage media presented herein include one or more devices and/or other machine-readable media for storing information. Further the transmission media include a wireless channel and various other media which are capable of transferring a command(s) and/or data, but are not limited thereto.

It will be appreciated that a specific order or a hierarchical structure of steps in the presented processes is one example of exemplary accesses. It will be appreciated that the specific order or the hierarchical structure of the steps in the processes within the scope of the present disclosure may be rearranged based on design priorities. Appended method claims provide elements of various steps in a sample order, but it does not mean that the method claims are limited to the presented specific order or hierarchical structure.

The description of the presented embodiments is provided so that those skilled in the art of the present disclosure use or implement the present disclosure. Various modifications of the embodiments will be apparent to those skilled in the art and general principles defined herein can be applied to other embodiments without departing from the scope of the present disclosure. Therefore, the present disclosure is not limited to the embodiments presented herein, but should be analyzed within the widest range which is consistent with the principles and new features presented herein.

What is claimed is:

1. A computer program stored in a computer-readable storage medium, wherein the computer program executes a method for moving an extent when the computer program is executed by one or more processors of a computing device, the method comprising:

deciding, by the one or more processors, movement of an extent stored in a first disk in a disk space in which the disk space includes at least two disks;

determining, by the one or more processors, that there is a writing work for the extent when there is a transaction sequence number of a worker thread less than or equal to a transaction sequence number of the extent mapping information by comparing the transaction sequence number of the extent mapping information and the transaction sequence number of the worker thread;

switching, by the one or more processors, the worker thread performing the writing work for the extent to a sleep state when there is the writing work for the extent;

changing, by the one or more processors, a state of the extent to read-only in the extent mapping information when there is no writing work for the extent;

moving, by the one or more processors, the extent positioned in the first disk to a second disk; and updating, by the one or more processors, the extent mapping information based on completion of the movement of the extent.

2. The computer program stored in the computer-readable storage medium of claim 1, wherein the extent mapping information is configured for each extent and includes at least one information of address information of the extent, state information of the extent, and a transaction sequence number of the extent.

3. The computer program stored in the computer-readable storage medium of claim 2, wherein when the writing work for the extent occurs, the transaction sequence number is updated to the transaction sequence number of a worker thread performing the writing work for the extent.

4. The computer program stored in the computer-readable storage medium of claim 1, wherein the method further includes modifying, when the writing work for the extent is completed, the transaction sequence number of the extent mapping information to the transaction sequence number of the worker thread.

5. The computer program stored in the computer-readable storage medium of claim 1, wherein the updating, by the one or more processors, the extent mapping information based on completion of the movement of the extent includes:

determining, by the one or more processors, whether there is the writing work for the extent when the movement of the extent is completed, and changing an extent state of the extent mapping information to loading when there is the writing work for the extent, updating the extent mapping information by waiting for the completion of the writing work, or updating the extent mapping information when there is the no writing work for the extent.

6. The computer program stored in the computer-readable storage medium of claim 5, wherein when the extent state of the extent mapping information is loading, a worker thread accessing the extent mapping information is switched to a standby state and written in a standby list.

7. The computer program stored in the computer-readable storage medium of claim 1, wherein the movement for the extent stored in the first disk is decided for rebalancing when a new disk is added to the disk space, one or more disks are removed, or an error occurs in one of the at least two disks.

8. The computer program stored in the computer-readable storage medium of claim 1, wherein the method further includes resuming, by the one or more processors, the writing work for the extent based on the update of the extent mapping information.

9. The computer program stored in the computer-readable storage medium of claim 1, wherein the method further includes deleting, by the one or more processors, the extent positioned in the first disk.

10. A method for moving an extent, which is performed by one or more processors of a computing device, the method comprising:

deciding, by the one or more processors, movement of an extent stored in a first disk in a disk space in which the disk space includes at least two disks;

determining, by the one or more processors, that there is a writing work for the extent when there is a transaction sequence number of a worker thread less than or equal to a transaction sequence number of the extent mapping information by comparing the transaction sequence number of the extent mapping information and the transaction sequence number of the worker thread;

switching, by the one or more processors, the worker thread performing the writing work for the extent to a sleep state when there is the writing work for the extent;

changing, by the one or more processors, a state of the extent to read-only in the extent mapping information when there is no writing work for the extent;

moving, by the one or more processors, the extent positioned in the first disk to a second disk; and updating, by the one or more processors, the extent mapping information based on completion of the movement of the extent.

11. A computing device comprising:

one or more processors; and memory storing commands executable in the one or more processors, wherein the one or more processors is configured to:

decide movement of an extent stored in a first disk in a disk space in which the disk space includes at least two disks, determine that there is a writing work for the extent when there is a transaction sequence number of a worker thread less than or equal to a transaction sequence number of the extent mapping information by comparing the transaction sequence number of the extent mapping information and the transaction sequence number of the worker thread, switch the worker thread performing the writing work for the extent to a sleep state when there is the writing work for the extent, change a state of the extent to read-only in the extent mapping information when there is no writing work for the extent, move the extent positioned in the first disk to a second disk, and update the extent mapping information based on completion of the movement of the extent.

* * * * *